United States Patent
Bailey et al.

(10) Patent No.: US 7,631,010 B2
(45) Date of Patent: Dec. 8, 2009

(54) SYSTEMS AND METHODS IN SUPPORT OF DATA BASE PAGE SYNCHRONIZATION

(75) Inventors: Steven Bailey, Sammamish, WA (US); David J Nettleton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 10/826,509

(22) Filed: Apr. 16, 2004

(65) Prior Publication Data

US 2005/0234974 A1    Oct. 20, 2005

(51) Int. Cl.
  *G06F 17/00*    (2006.01)
(52) U.S. Cl. .................................. 707/103 Y; 707/200
(58) Field of Classification Search .................. 707/2, 707/3, 5, 8, 100, 101, 103 R, 20, 7, 103 Y, 707/200; 709/170, 213, 217; 711/201, 213, 711/152, 170, 208, 209
See application file for complete search history.

(56) References Cited

U.S. PATENT DOCUMENTS

| | | | |
|---|---|---|---|
| 5,280,612 A | 1/1994 | Lorie et al. | |
| 5,317,731 A | 5/1994 | Dias et al. | |
| 5,418,940 A | 5/1995 | Mohan | |
| 5,455,944 A | 10/1995 | Haderle et al. | |
| 5,574,902 A | 11/1996 | Josten et al. | |
| 6,249,852 B1 * | 6/2001 | Benayon et al. | 711/170 |
| 6,643,753 B2 * | 11/2003 | Avner et al. | 711/170 |
| 6,889,249 B2 * | 5/2005 | Miloushev et al. | 709/213 |
| 2002/0129011 A1 * | 9/2002 | Julien | 707/3 |

OTHER PUBLICATIONS

Andreas, Using subpages for cohenrency control in parallel database systems, 1990, Department of Computer Science, Germany, pp. 765-768.*

V.K. Chaudhri and V. Hadzilacos. Safe Locking Policies for Dynamic Databases. Proceedings of the 14th ACM SIGACT-SIGMOD-SIGART Symposium on Principles of Database Systems, pp. 233-244, 1995.

E. Panagos, A. Biliris, H. Jagadish, and R. Rastogi. Fine-granularity Locking and Client-Based Logging for Distributed Architectures. In Proc. of EDBT Conference, pp. 388-402, 1996.

Tatu Ylonen. Shadow Paging is Feasible. Department of Computer Science, Helsinki University of Technology, 1995. 16 pages.

* cited by examiner

*Primary Examiner*—Fred I Ehichioya
(74) *Attorney, Agent, or Firm*—Workman Nydegger

(57) ABSTRACT

Systems and methodologies are provided for enforcing a set of conditions such that prior to a commit stage of a transaction, a space availability for a particular page can be typically assured (e.g., that transactions operating on various copies of the page do not consume all of storage space on that page), and reorganization of data around the page is mitigated (e.g., that a transaction need not move data around the page for purpose of merging various copies.) A page aggregator and a heap manager can facilitate operations of concurrent transactions at a subpage level (e.g., a row level), during such modifications of a data base by multiple users.

9 Claims, 13 Drawing Sheets

SYSTEMS AND METHODS IN SUPPORT OF DATA BASE PAGE SYNCHRONIZATION

TECHNICAL FIELD

The present invention relates generally to concurrent transactions in databases, and more particularly to systems and methods that facilitate concurrent transactions at the subpage level when employing a page versioning/copying approach.

BACKGROUND OF THE INVENTION

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well. As such, much business data is stored in databases, under the management of a database management system (DBMS).

For such DBMS systems, a demand for database transaction processing capacity in large installations has been growing significantly. At the same time, a large percentage of overall new database applications have been in a relational database environment. Such relational database can further provide an ideal environment for supporting various forms of queries on the database. For example, a growth in the use of ad hoc unstructured concomitant queries-is a trend that is expected to accelerate in such database environments. This can result in a growing requirement for simultaneously supporting both high volume transaction processing and unstructured queries against the same database. Thus, systems and methodologies that can effectively support both high volume transactions and complex queries, with minimal interference between the two, while sharing copies of data are in demand.

Typically, business entities create and maintain their databases through a high volume of relatively simple transactions, with an essential function of a database engine being able to execute a plurality of such transactions concurrently. Each of such plurality of transactions can be considered a piece of work, which can further consist of a sequence of operations such as, read, write, update, and/or delete, against a database. Such transaction can represent well-understood business operations (e.g., creating a new customer record, noting an account payment or transfer, and the like). Increasingly enterprises are becoming interested in running more ad hoc unstructured queries against their online data. As such, a measure of the correctness of the state of the database or a database integrity becomes increasingly vital.

In general database integrity can refer to the problem of ensuring that two or more concurrently executing transactions do not interfere with each other in such a manner as to produce an incorrect state in the database. An application programmer typically should ensure that each transaction produces a correct state, and that each transaction begins when the database is in a correct state. Such transaction management should generally adhere to the ACID (Atomicity, Consistency, Isolation and Durability) standards. In general, Atomicity can refer to a feature that: either the results of the transaction (i.e., changes to the database) are all properly reflected in the database, or none of them are. When a transaction commits, all changes made to the database by the transaction are durably stored, leaving the database in a consistent state. When a transaction aborts, any changes made to the database by the transaction are backed out, once again leaving the database in a consistent state. Similarly, consistency controls a state of the data should a failure occur. Thus, a transaction must bring the database from one consistent state to another consistent state. Likewise, isolation in general means that the events within a transaction must be hidden from other transactions running concurrently, and that concurrent transactions must not interfere with each other. Put differently, they execute as if they had the database to themselves. Finally, durability typically refers to a feature that once a transaction has been completed and has committed its results to the database, the system must guarantee that these results survive any subsequent malfunctions. Yet, when multiple copies of data pages are created, such standards can be difficult to adhere to. At the same time, the more efficiently a database engine supports concurrent transactions, the better an end-user experience can be in terms of speed of operation and reduced database growth.

Therefore, there is a need to overcome the aforementioned deficiencies associated with conventional systems and methodologies related to database operations.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for systems and methods that employ a page aggregator and a heap manager to facilitate operations of concurrent transactions at a subpage level (e.g., a row level), during modifications of a data base by multiple users. Such concurrent transactions can operate on various copies of a data page, with each transaction modifying its respective copy of the data page. Accordingly, the present invention facilitates active transactions to efficiently keep their respective copies up to date with committed version of that page.

In accordance with an aspect of the present invention, a set of conditions can be enforced such that prior to a commit stage of a transaction, a space availability for a particular page can be typically assured (e.g., that transactions operating on various copies of the page do not consume all of storage space on that page), and reorganization of data around the page is mitigated (e.g., that a transaction need not move data around the page for purpose of merging various copies.) Such framework enables a commit operation to occur with efficiency and simplicity, thus improving multi user operation and conserving system resources.

In a related aspect of the present invention, the page aggregator can operate across a plurality of concurrent transactions to retrieve information on an aggregate size change that occurs on the various copies of a particular page. Such aggregate size change information, (which can occur as a result of multiple users performing sub-page modifications on their respective copies of that page), can then be supplied to the heap manager to facilitate determination of space available for various operations to be performed on that page. Accordingly, space consumed on a page and a space available thereon can be determined prior to a commit stage operation by a transaction or user. Thus, in addition to logical considerations for sub page modifications (e.g., whether there is logical permission to insert a row at a particular location), the present invention also considers the physical properties of that page (e.g., whether there is space available on a particular page at time of insertion).

According to a further aspect of the present invention, a lock manager can be provided that allows sub page level locks across concurrent transactions. Such lock manager can be visible to all transactions, and based on a normal concurrency of operation a determination can be made whether a lock on a particular resource (e.g., a row level lock) can be granted. Subsequently information available in lock manager (e.g. grant of exclusive locks at particular locations) can be employed by the page aggregator to enable determination of space consumptions across a respective copy of data page across all transactions. As such, the lock manager can facilitate compatibility of operations across concurrent transactions, and administer logical considerations during modifications of the database.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
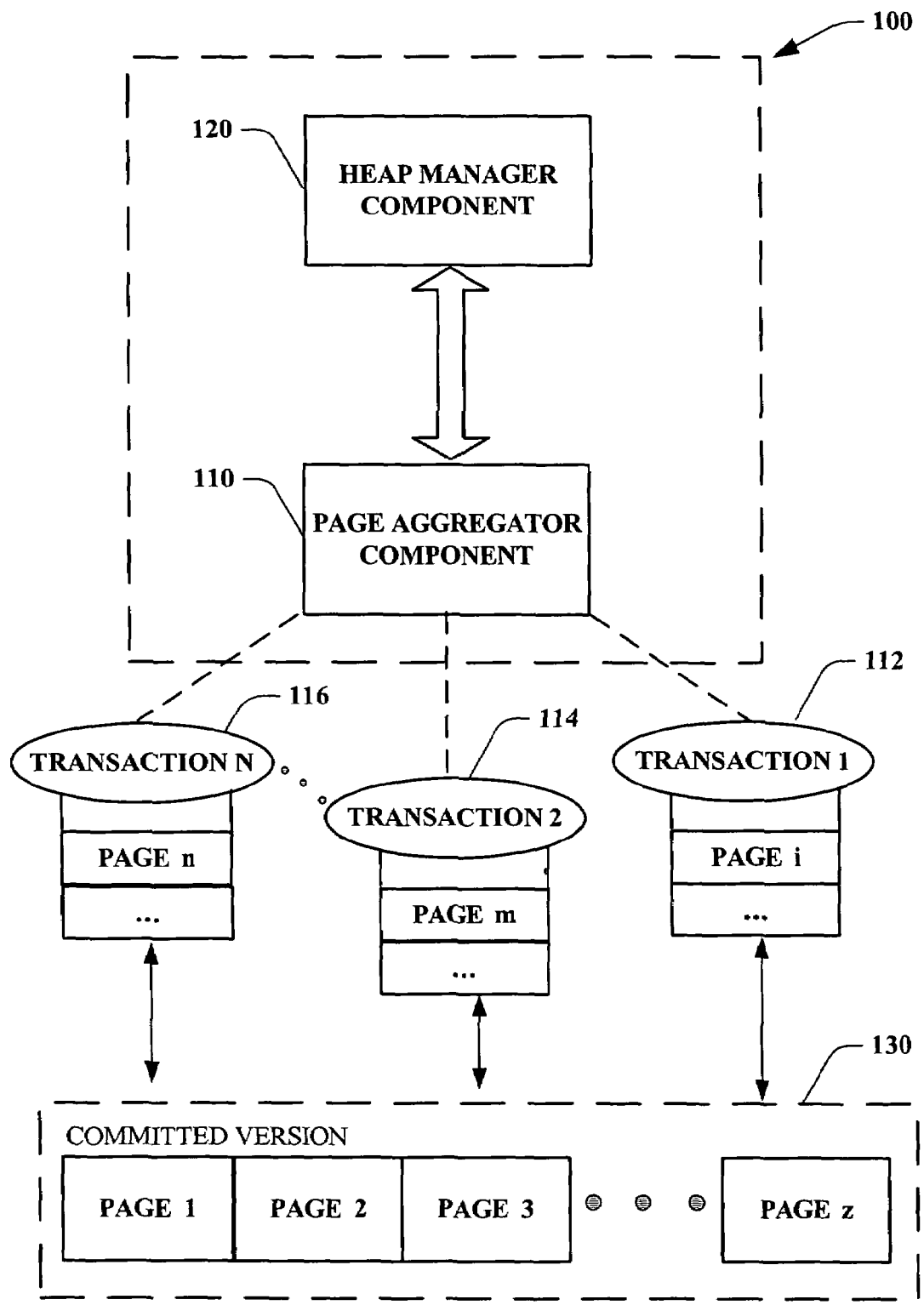
FIG. 1 is a block diagram of a data base engine in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The present invention provides for systems and methods that employ a page aggregator and a heap manager to facilitate operations of concurrent transactions at a subpage level (e.g., a row level), during modifications of a data base by multiple users. Referring initially to FIG. 1, a data base engine 100 is illustrated that incorporates a page aggregator component 110 and a heap manager component 120. The page aggregator component 110 can operate across a plurality of concurrent transactions 112, 114 and 116, with N being an integer. Each of the transactions 112 thru 116 can in turn operate on its respective copy of a data page(s), which is being copied from a committed version 130 of data pages (i, m, p, n and z being integers), in addition to any data pages created by the transaction. Such operations can for example include row level manipulation of data in each page. Typically, the data base engine 100 can be a multiple user engine that can further enable a plurality of users to simultaneously perform operations in a data base (not shown). Should a transaction require modifying data in a page, initially the page can be copied to a space reserved for that transaction. Thereafter, the transaction can operate on such copied page and modify required data. By operating across a plurality of pages the page aggregator 110 can retrieve information on an aggregate size change that occurs on the various copies of a particular page. As such, space consumed on a page, as well as the space available on a page can be determined. Such data collected can then be supplied to a heap manager 120. The heap manager 120 can then track availability of space on the page, and determine whether sufficient space is available to perform some part of or all of a transaction (e.g., insert a new row, update a row with additional data and the like.)

For example, at any given time the multiple transactions 1 to N (N being an integer) can desire a modification to a particular data page of a data base. Such modifications can include change of data at a particular slot, insertions of rows, deletion of rows and the like. A transaction can then copy the data page to a reserved space, with each transaction inserting rows or deleting rows in its respective copy of that data page. Accordingly, the page aggregator 110 can then retrieve information on an aggregate size change that occurs on the various copies of a particular page, and in combination with the heap manager enforce conditions such that prior to a commit stage of a transaction, a space availability for a particular page can be typically assured—for example, the empty space available on a page will not be consumed across all transactions. Moreover, such system can typically assure that reorganization of data around the page is mitigated, as described in more detail infra.

Figure 2:
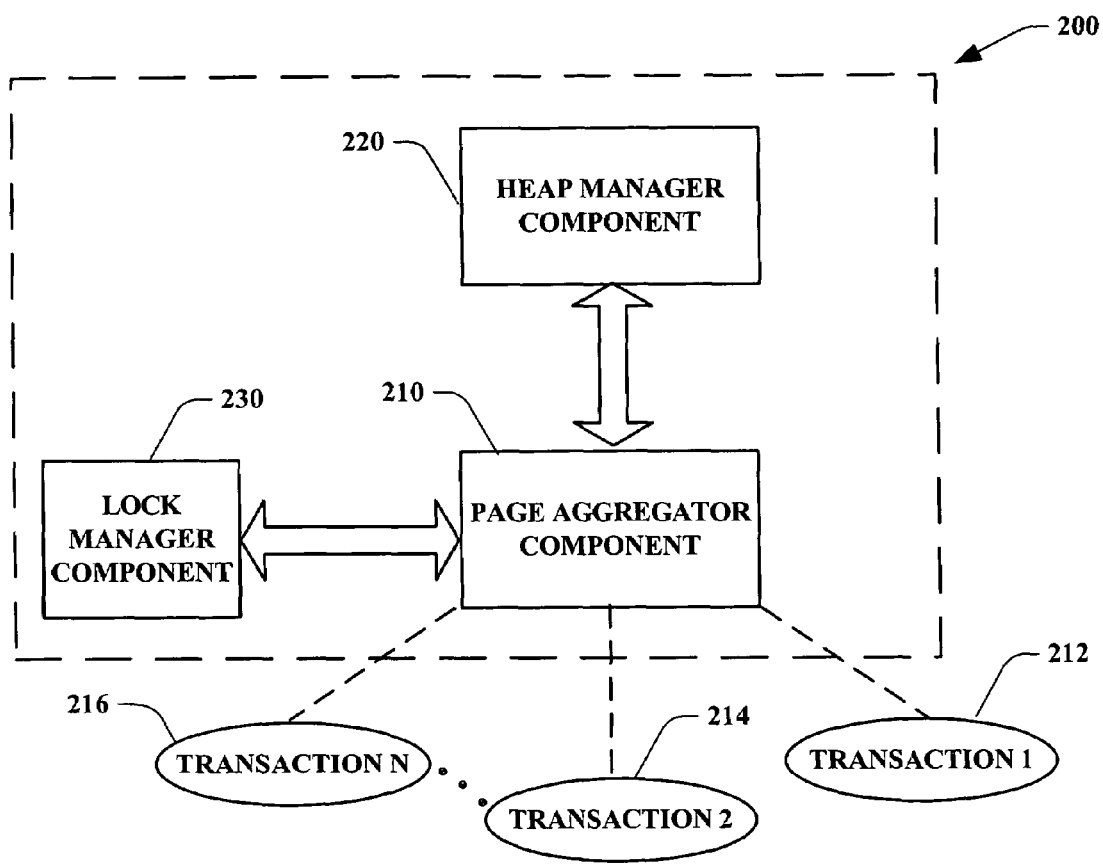
FIG. 2 is another block diagram of another data base engine with a lock manager in accordance with an aspect of the present invention.

FIG. 2 illustrates another aspect of a data base engine 200 that further incorporates a lock manger 230. The lock manager 230 can determine whether a lock on a particular resource can be granted, and is typically well suited to administer sub-page locking (e.g., row level locking), as each transaction T1 to Tn can operate on its respective copy of a data page. Since many copies of the data page can exist at any given time, the lock manager 230 can typically assure that concurrent transaction can modify information in a same data page, albeit at different rows. For example, lock manager 230 can grant an exclusive lock for a particular row to a transaction, and other transactions would then be restricted to modify such row, even though modifications to other rows can still be permitted. Thus, based on a normal concurrency of operations, the lock manager 230 can grant or deny a lock to a particular resource. According to one particular aspect of the present invention, the lock manger 230 can be independent of the page aggregator 210 and the heap manager 220 of the database engine. In a related aspect, extra information is stored in the lock manager (e.g., grant of exclusive locks at particular locations, empty space availability, and the like) and can be employed by the page aggregator to track consumption of available space for a data page over all concurrent transactions, (e.g., the page aggregator can typically act as an algorithm that traverses the lock structure, as no storage space is required for the page aggregator.)

Accordingly, since modifications by various transactions on a data page occur on separate copies of the data page, the page aggregator 210 in conjunction with the heap manager 220 can enable determination of space consumptions across a respective copy of data page employed by each transaction, while the lock manager 230 can typically assure that logically a transaction is permitted to modify a particular resource. This facilitates operations of concurrent transactions at a subpage level (e.g., a row level), during modifications of a data base by multiple users. In addition, during a read operation of a data page (e.g., when no modification to a data page is required) there will typically be no requirement to request shared locks as a read can be requested from a committed state of the data page. Furthermore if a read operation is required by a transaction that has a copy of any data pages, then the read operation will again not require share locks, as a read can be achieved using the committed pages and/or the transactions version of any pages, (typically the transaction's pages can be used in preference to the committed pages).

Figure 3:
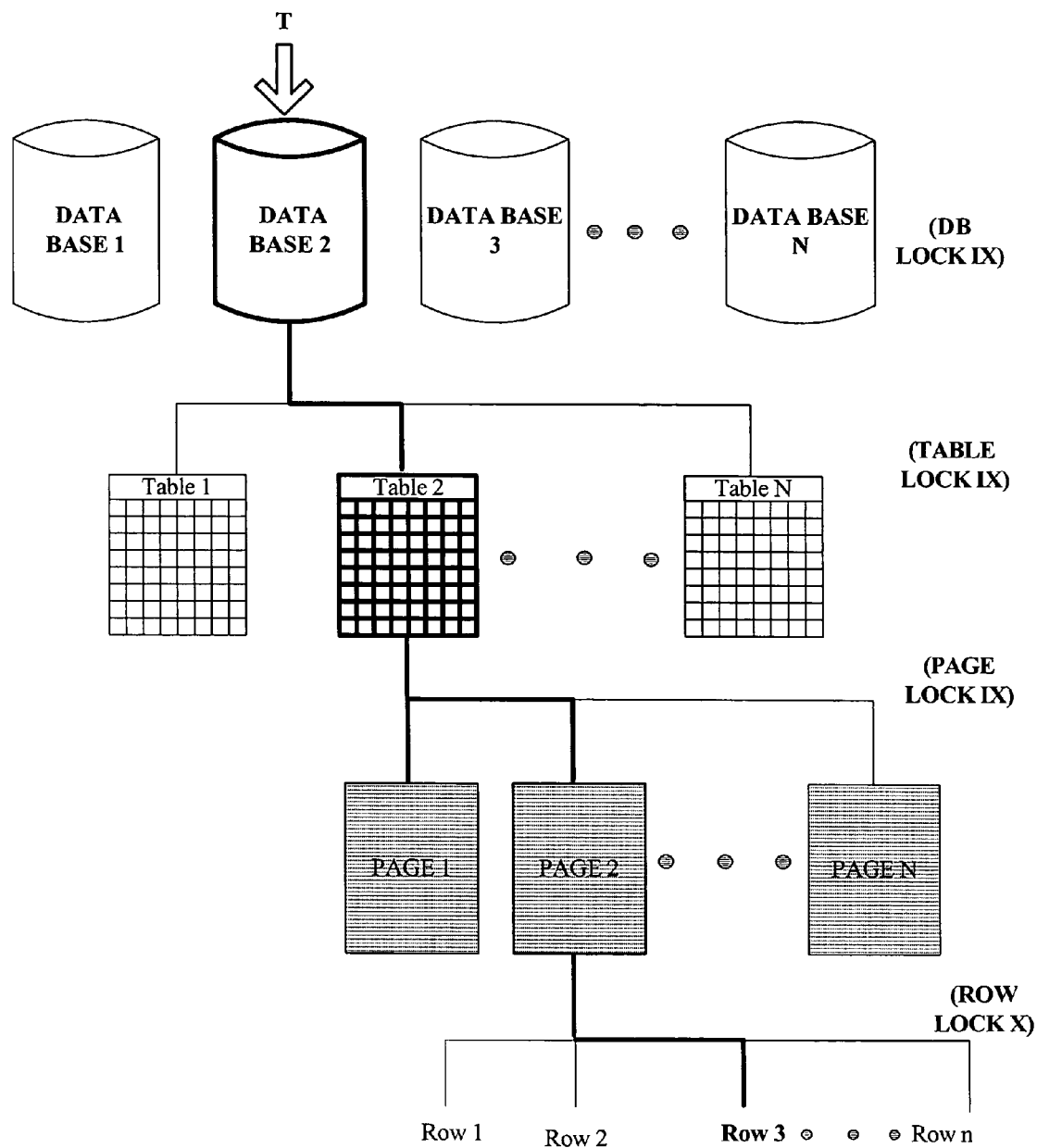
FIG. 3 illustrates an exemplary lock hierarchy administered by the lock manager in accordance with an aspect of the present invention.

FIG. 3 illustrates an exemplary lock hierarchy granted by the lock manager 230. As illustrated in the lock granularity, an exclusive lock has been granted for transaction T that requests a modification on row 3 on data page 2 of table 2, of data. As such, a copy of data page 2 can be copied to a reserved space (not shown) of transaction T, and transaction T can then proceed with its modification. Such exclusive lock grant to row 2 can be visible to other transactions, and typically no other transaction can modify such row on its respective copy of data page 2, until T commits its modification and the lock is released.

Figure 4:
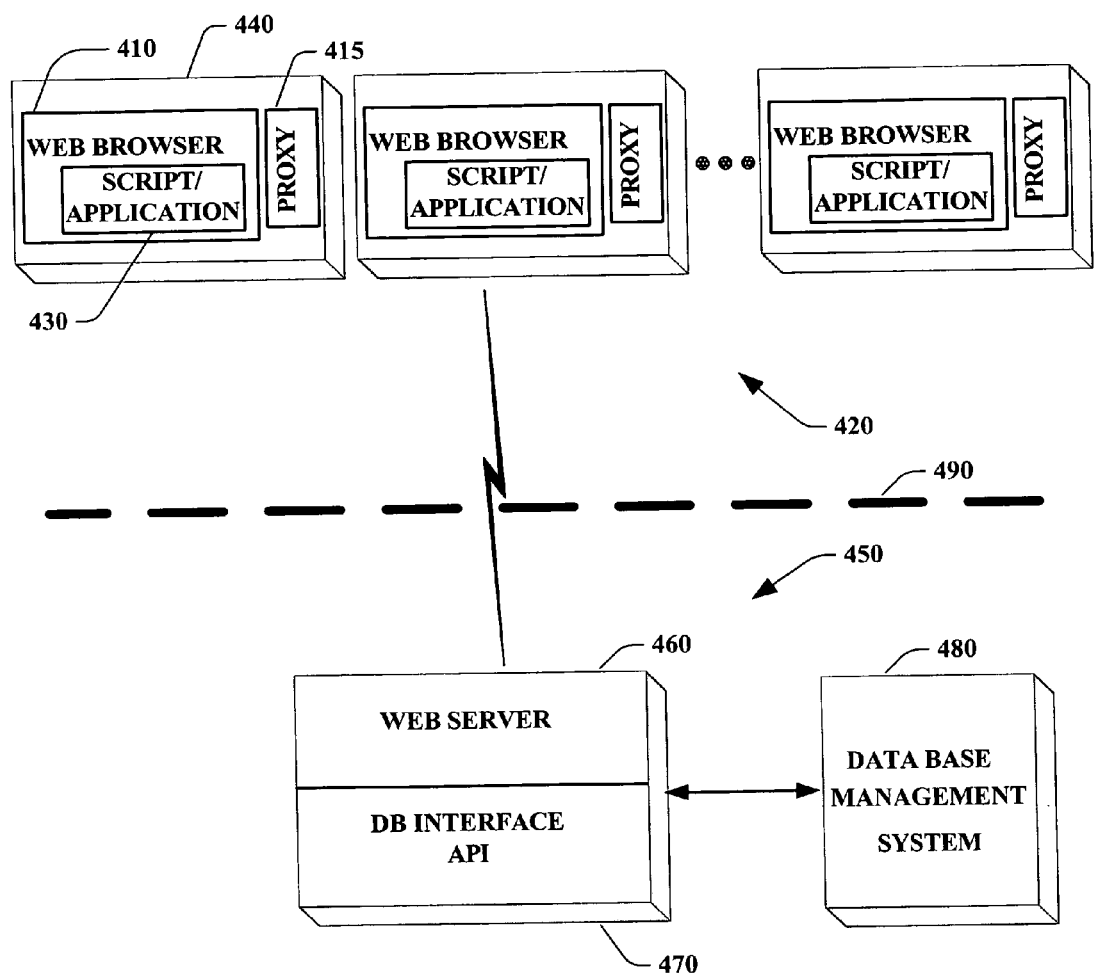
FIG. 4 illustrates a block diagram of a client server network that employs concurrent transactions in accordance with an aspect of the present invention.

FIG. 4 illustrates a plurality of clients that request modification to a data base in accordance with an aspect of the present invention, wherein running on each of the client 420 can be a client process, for example, a web browser 410. Likewise, running on the server 450 can be a corresponding server process, for example, a web server 460. In addition, embedded in the Web Browser 410 can be a script or application 430, and running within the run-time environment 440 of the client computer 420, can exist a proxy 415 for packaging and unpacking data packets formatted. Communicating with the server 450 is a database management system (DBMS) 480, which manages access to a database (not shown). The DBMS 480 and the database (not shown) can be located in the server itself, or can be located remotely on a remote database server (not shown). Running on the Web server 460 is a database interface Applications Programming Interface (API) 470, which provides access to the DBMS 480. The client computer 420 and the server computer 450 can communicate with each other through a network 490. It is to be appreciated that other arrangements are also possible, for example the client computer and the server computer being the same computer. When the client process, e.g., the Web browser 410, requests data from a database, the script or application 430 issues a query, which is sent across the network (e.g. internet) 490 to the server computer 450, where it is interpreted by the server process, e.g., the Web server 460. The client's 420 request to server 450 can contain multiple commands, and a response from server 450 can return a plurality of result sets.

In such communication, session, presentation, and application service elements can be provided by Tabular Data Stream (TDS). Since TDS does not require any specific transport provider, it can be implemented over multiple transport protocols and the network 490. Responses to client commands that are returned can be self-describing, and record oriented; (e.g., the data streams can describe names, types and optional descriptions of rows being returned.)

On the client side 420 the data can be a Structured Query Language (SQL) command being in a language that the server side 450 can accept, a SQL command followed by its associated binary data (e.g., the data for a bulk copy command), or an attention signal. When a connection is desired, the client 420 can send a connection signal to the server. Even though the client 420 can have more than one connection to the server 450, each connection path can be established separately and in the same manner.

Once the server 450 has received the connection signal from the client 420 it will notify the client that it has either accepted or rejected the connection request. Likewise to send SQL command or batch of SQL commands; then the SQL command (e.g., represented by a Unicode format) can be copied into the data section of a buffer and then sent to the SQL Server side 450. In addition, various Open Data Base Connectivity (ODBC) routines can cause SQL command to be placed into a client message buffer, or can cause the message buffer to be sent to the server. Once a modification is desired and prior to a commit stage of a transaction, a space availability for a particular page can be typically assured (e.g., that transactions operating on various copies of the page do not consume all of storage space on that page), and reorganization of data around the page can be mitigated (e.g., that a transaction need not move data around the page for purpose of merging various copies.) Such framework enables a commit operation to occur with efficiency and simplicity, thus improving multi user operation and conserving system resources. To further illustrate various aspects of the present invention, the following example are provided for two transactions $T_1$ and $T_2$ operating on a time line t, to describe inefficiencies in page merging and/or synchronization of concurrent transactions. For example, inefficiencies in a merging process can arise if a transaction is not able to immediately write its changes to a page, because a previous transaction has consumed all the available space and has committed. Similar inefficiencies can arise when data is required to be displaced and reorganized around a page.

Figure 5:
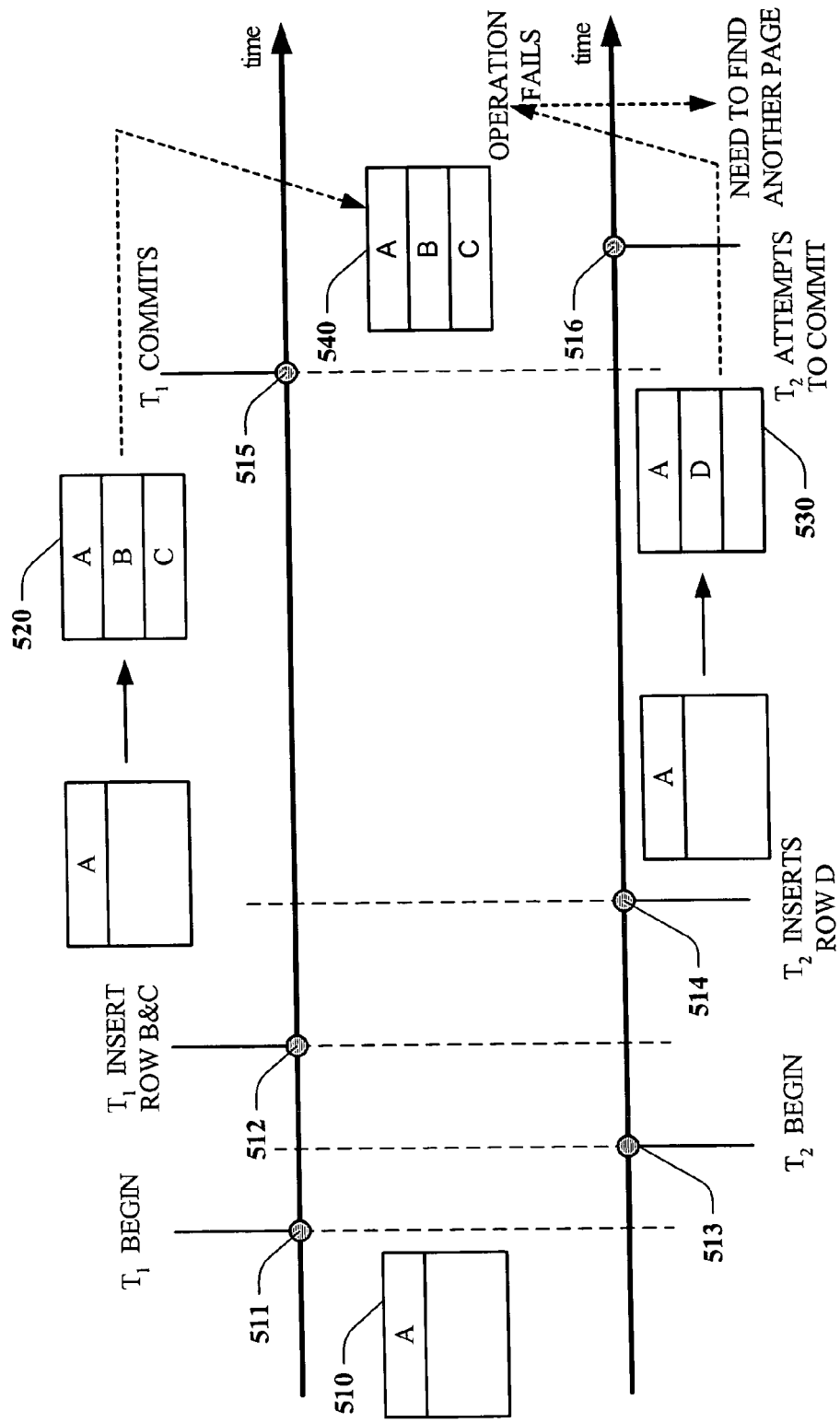
FIGS. 5 & 6 illustrate exemplary inefficiencies in page merging and/or synchronization of concurrent transactions.

Referring now to FIG. 5, two concurrent transaction $T_1$ and $T_2$ are illustrated that can operate on same data page 510. The data page 510 initially contains row A. At 511 $T_1$ begins operation on a copy of data page 510 and inserts rows B and C at 512. Such insertions of rows B and C occupy the available space on data page 510 as depicted at 520. Before $T_1$ commits at 515, another transaction $T_2$ starts at 513 and initiates modification of data page 510. Such modification includes insertion of a new row D at 514 to obtain a modified copy of the data page at 530. Next, $T_1$ commits at 515 and a committed version of data page having rows A, B, C that have occupied the page, is updated at 540. If $T_2$ now attempts to commit at 516, the commit operation cannot succeed without first finding another page for positioning of row D. Accordingly, merging and/or synchronization between various copies of data page 510 can typically face difficulties, and result in a waste of system resources, for example adding new pages at all times.

Figure 6:
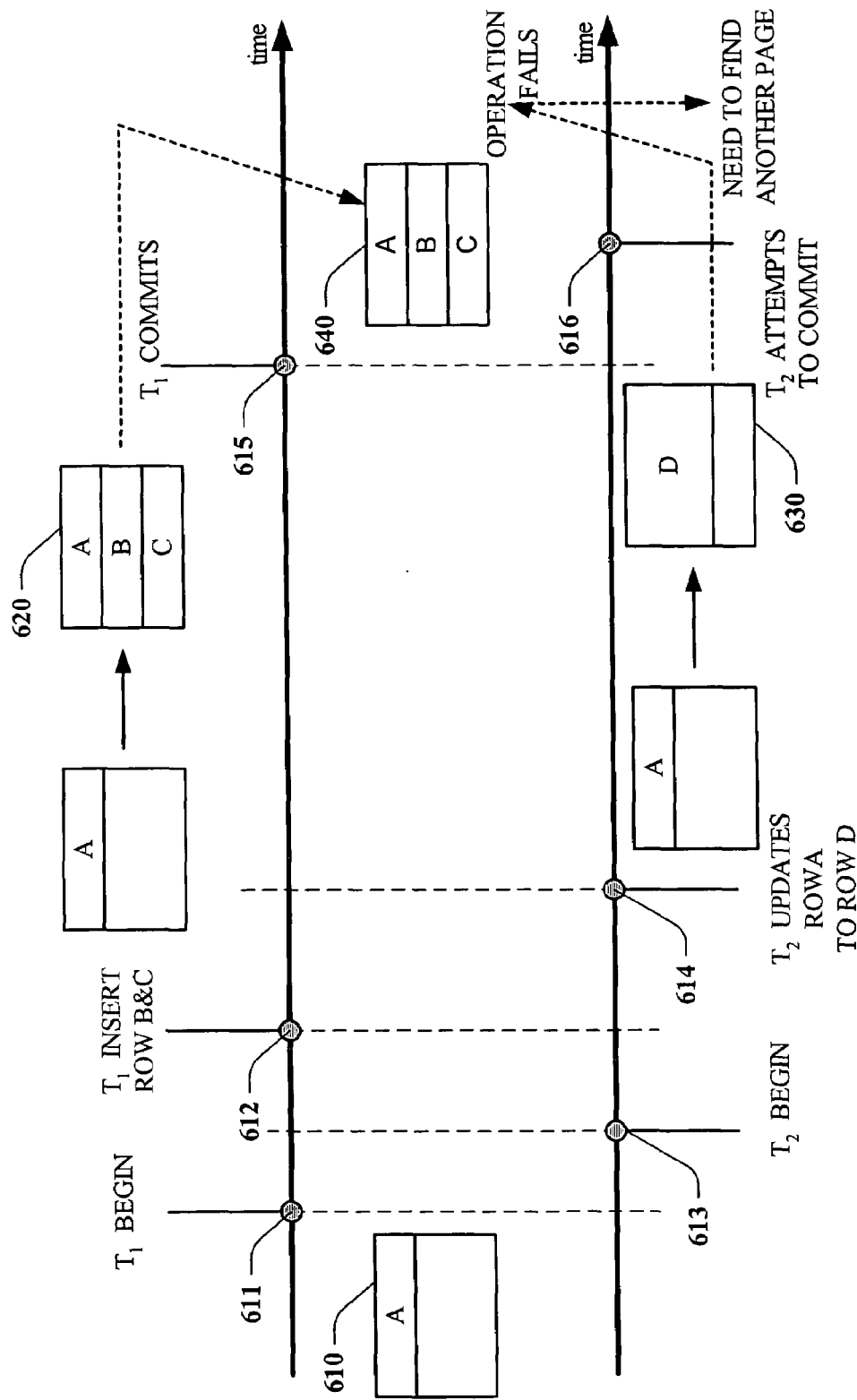

Similar inefficiencies can also occur when an update to a data page occurs, if a row is updated with information requiring additional space. Referring now to FIG. 6, the data page 610 initially contains row A. At 611 $T_1$ begins operation on a copy of data page 610 and inserts rows B and C at 612. Such insertions of rows B and C occupy the available space on data page 610 as depicted at 620. Before $T_1$ commits at 615, another transaction $T_2$ starts at 613 and initiates modification of data page 610. Such modification includes replacing row A with a row D, which consumes twice the space of row A at 614 to obtain a modified copy of the data page at 630. Next, $T_1$ commits at 615 and a committed version of data page having rows A, B, C that have filled the page, is updated at 640. If $T_2$ now attempts to commit at 616, the commit operation cannot succeed without first finding another page for positioning of row D.

By employing the page aggregator and the heap manager in accordance with an aspect of the present invention, a set of conditions can be enforced such that prior to a commit stage of a transaction, a space availability for a particular page can be typically assured (e.g., that transactions operating on various copies of the page do not consume all of storage space on that page), and reorganization of data around the page is mitigated (e.g., that a transaction need not move data around the page for purpose of merging various copies.) Such framework enables a commit operation to occur with efficiency and simplicity, thus improving multi user operation and conserving system resources.

Figure 7:
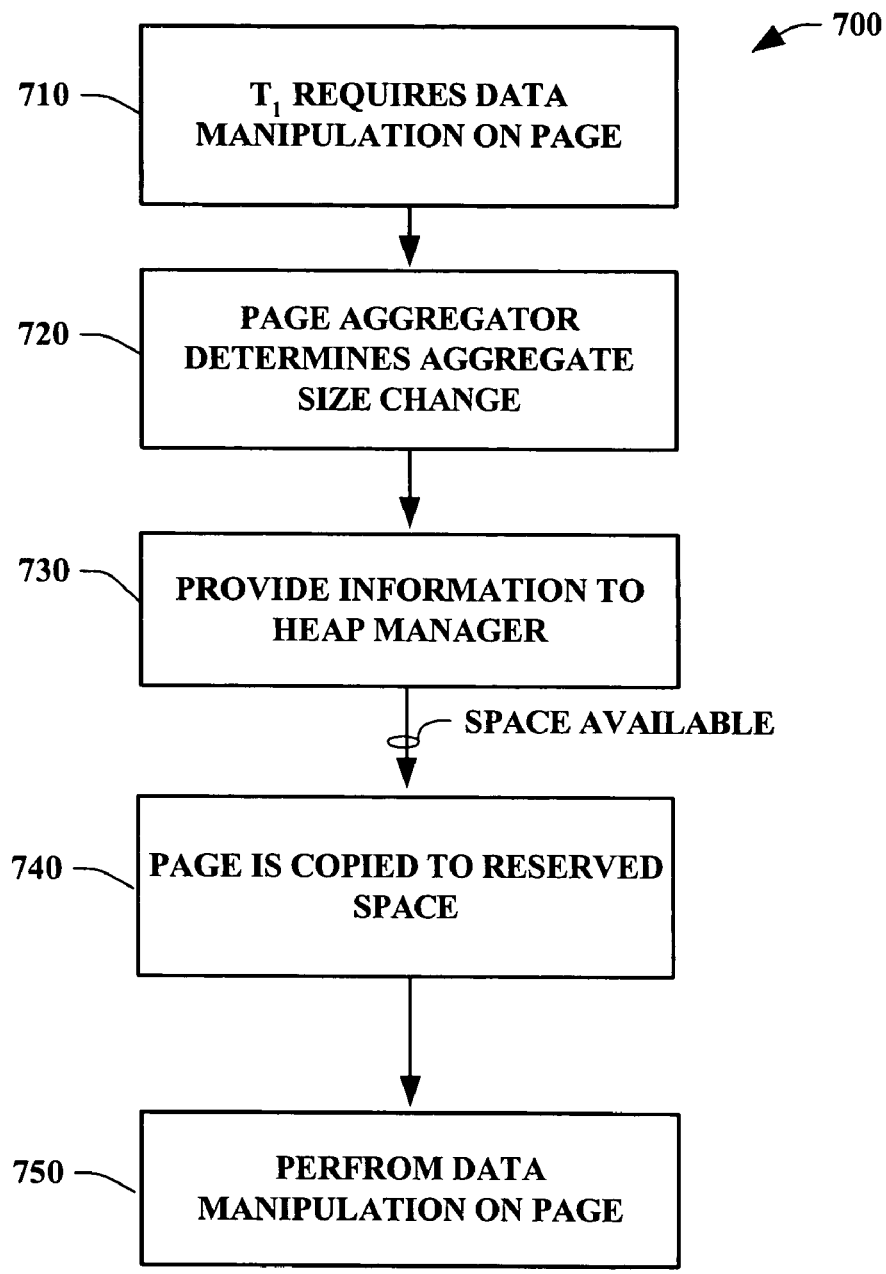
FIG. 7 illustrates a particular exemplary methodology according to one aspect of the present invention.

FIG. 7 illustrates a particular exemplary methodology according to one aspect of the present invention. Initially, and at 710 the transaction $T_1$ requests data manipulation to a page. The transaction $T_1$ can be part of a plurality of concurrent transactions that are operating as part of a multiple user database engine. The request for data manipulation by transaction $T_1$ can include change of data at a particular slot, replacing a row with an updated row, insertions of rows, deletion of rows and the like, on a particular data page. According to one aspect of the present invention, should the transaction $T_1$ require a commit operation after modification of required data, such transaction can be typically assured to succeed. At 720, the page aggregator of the present invention collects and retrieves information on an aggregate size change that occurs on the various copies of the particular data page, the various page copies being employed by other transactions to modify information on the particular page. Such gathered information, which can be collected from per row lock structures, can then be provided at 730 to a heap manager, which can track space consumed or available on the particular data page, based on modifications occurring by other transactions thereon. Upon successful verification of availability of space for performance of $T_1$, and at 740 a copy of the page requiring modification is copied to a reserved space for transaction $T_1$. As such, space consumed on a data page and a space available thereon can be determined prior to a selection of the page by a transaction for operating thereon (e.g., a determination can be made whether there is sufficient space available to perform a modification before a copying of such page.) Thus, in addition to logical considerations for sub page modifications (e.g., whether there is logical permission to insert a row at a particular location), the present invention also considers the physical properties of that page (e.g., whether there is space available on a particular page at time of insertion). $T_1$'s commit operation, thus occurs with efficiency and simplicity, while at the same time improving multi user operation and conserving system resources.

Figure 8:
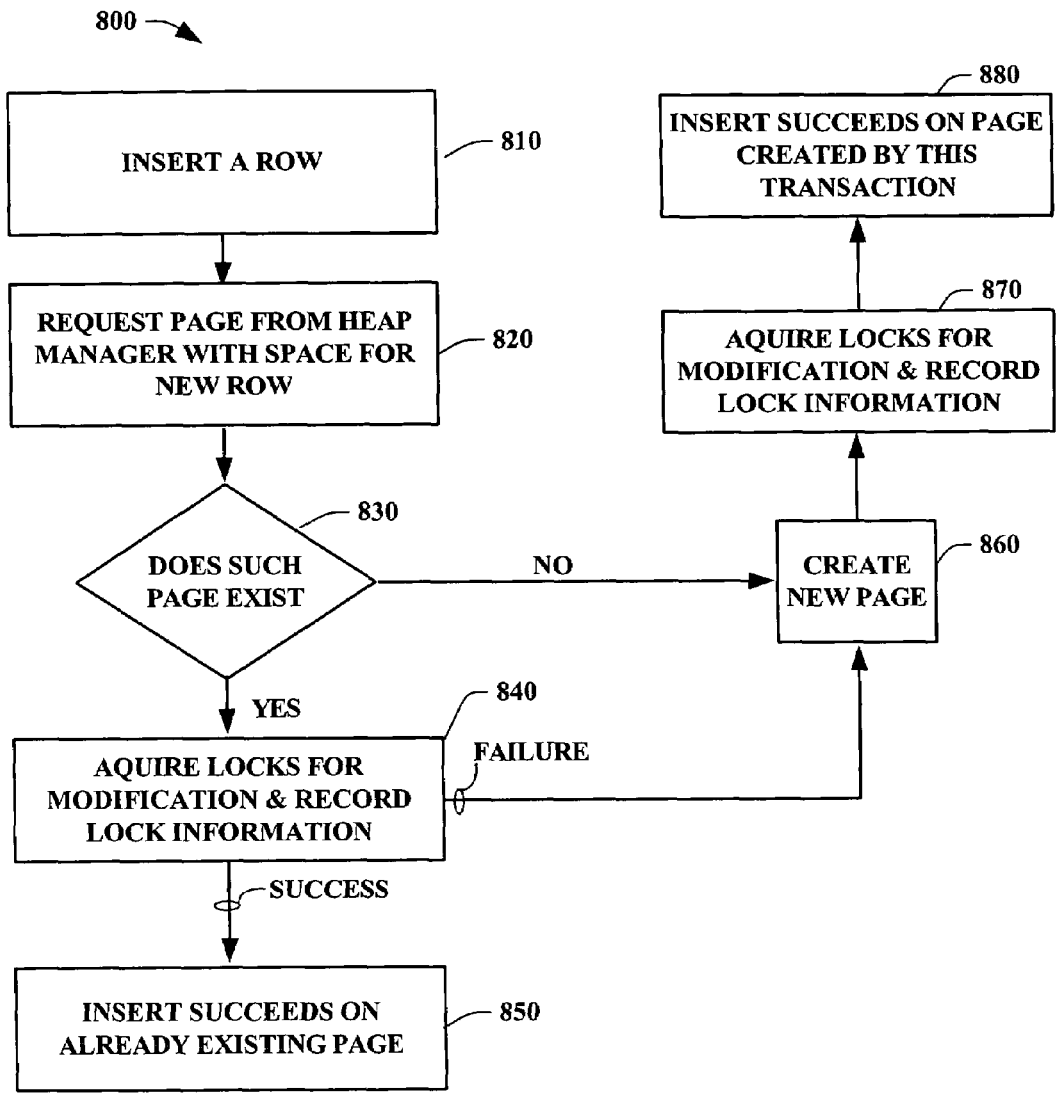
FIG. 8 illustrates an exemplary methodology for inserting a row in accordance with an aspect of the present invention.

Typically, if an insert operation has space available on a page created within its transaction scope, then the insert operation can insert data at such available space—instead of placing a lock on an existing committed page. Such can advantageously permit a transaction that is inserting many rows to minimize the shared resources that need to be locked. Alternatively, if the transaction does not create or have access to a new page, then the insert operation can be attempted on a committed page to employ a space available thereon for the insert operation. In determining whether there is space available on any of the existing pages, the heap manager can consider information supplied thereto by the page aggregator, to indicate whether there are other concurrent transactions that are operating on that page, and any associated space being consumed. For example, FIG. 8 illustrates a related methodology 800 for inserting a row in accordance with an aspect of the present invention. At 810 a new row insert operation is requested by a transaction. Next, at 820 a request for a page with sufficient space to insert new row is made from the heap manager. At 830 existence for such page with sufficient space is determined. If such page exists, the methodology proceeds to step 840 and suitable locks are requested from the lock manager and upon successful grant of locks the row insert succeeds in the already existing page, at 850. Alternatively, if no space is available on already existing page (or if proper locks cannot be granted at 840, or in a related aspect (not shown) if re-trying on a different page fails) a new page is created at 860, with proper lock grant at 870, and a successful row insert at 880 on a new page created by the transaction. Thus, in addition to logical considerations for sub page modifications (e.g., whether there is logical permission to insert a row at a particular location), the methodology 800 also considers the physical properties of that page (e.g., whether there is space available on a particular page at time of insertion).

Figure 9:
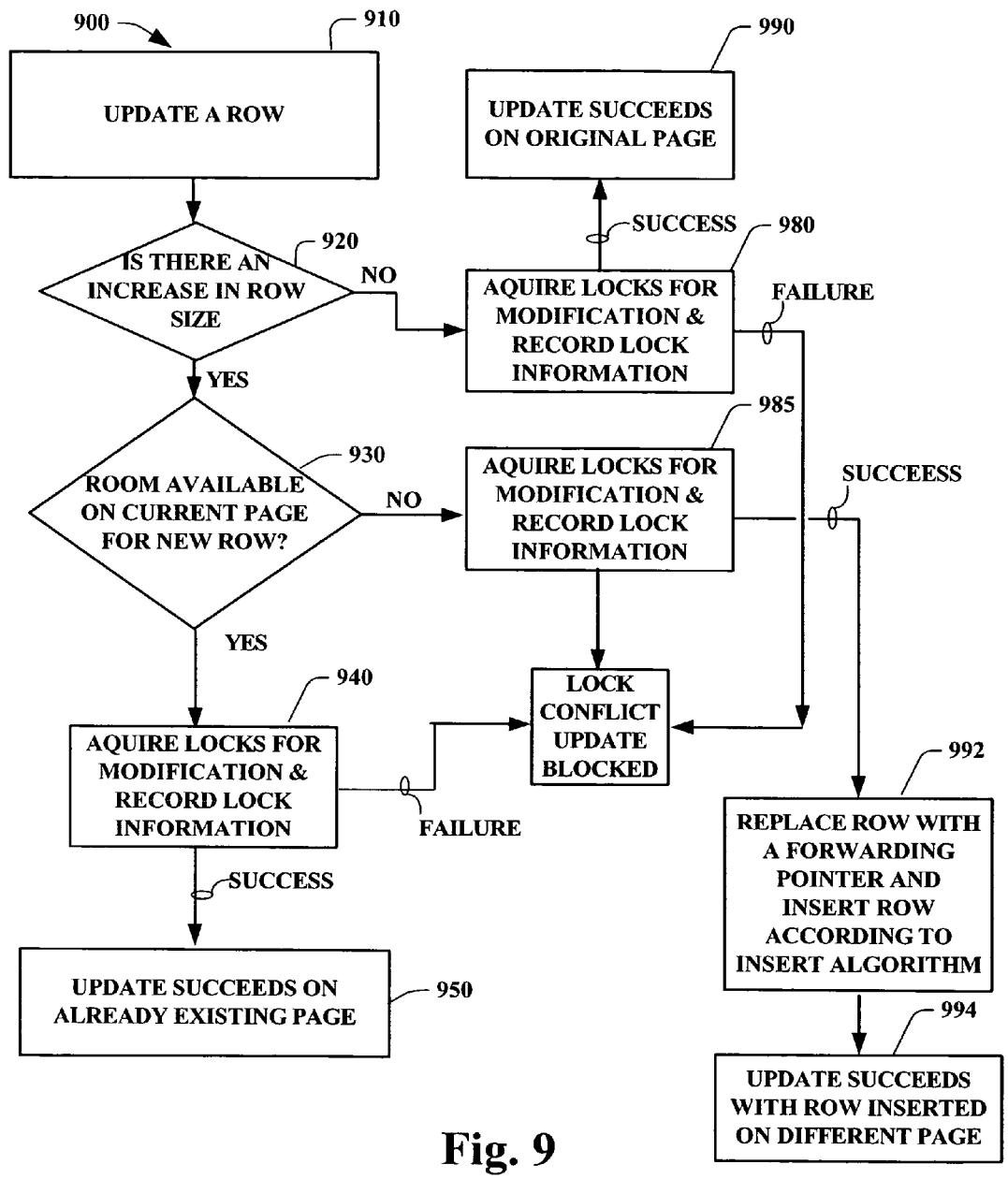
FIG. 9 illustrates another exemplary methodology for updating a row in accordance with an aspect of the present invention.

FIG. 9 illustrates another methodology 900 for updating a row at 910 in accordance with an aspect of the present invention. Typically, if an update operation results in a row that does not require additional space, the operation can always succeed provided appropriate locks can be granted, as illustrated at 940. Alternatively, if an update operation grows a row, then the heap manager can employ the page aggregator to determine availability of space initially on the page wherein the row currently exists, at 930. If a determination is made that space is available on a row's current page, the row is updated 950 and the size information recorded at 940 (e.g. in the row lock structure itself) such that other transactions are denied permission to employ the space available, (e.g., other transactions consult the page aggregator and realize that space is already consumed, and hence not available.) On the other hand, if there is not sufficient space for the updated row, then the row is inserted according to the insert algorithm described supra, with the old row employed to store a forwarding pointer to the updated row's new location on a different page, as illustrated at 992 and 994. Such pointer mechanism advantageously enables other database structures that stored the row's initial location to be guided to the new location, without requiring update procedures. It is to be appreciated that such forwarding pointer typically cannot be larger than the size of the row, a condition that can be readily enforced by the database engine.

Moreover, such operation can typically succeed, (e.g. assuming proper lock for the update are granted), and the operation can be considered pre-emptive in that the final location of the new row is determined during a normal operation of the update procedure, for example there typically is no requirement for re-arranging of data during a commit phase of a transaction updating a row. Such framework enables a commit operation to occur with efficiency and simplicity, thus improving multi user operation and conserving system resources.

Figure 10:
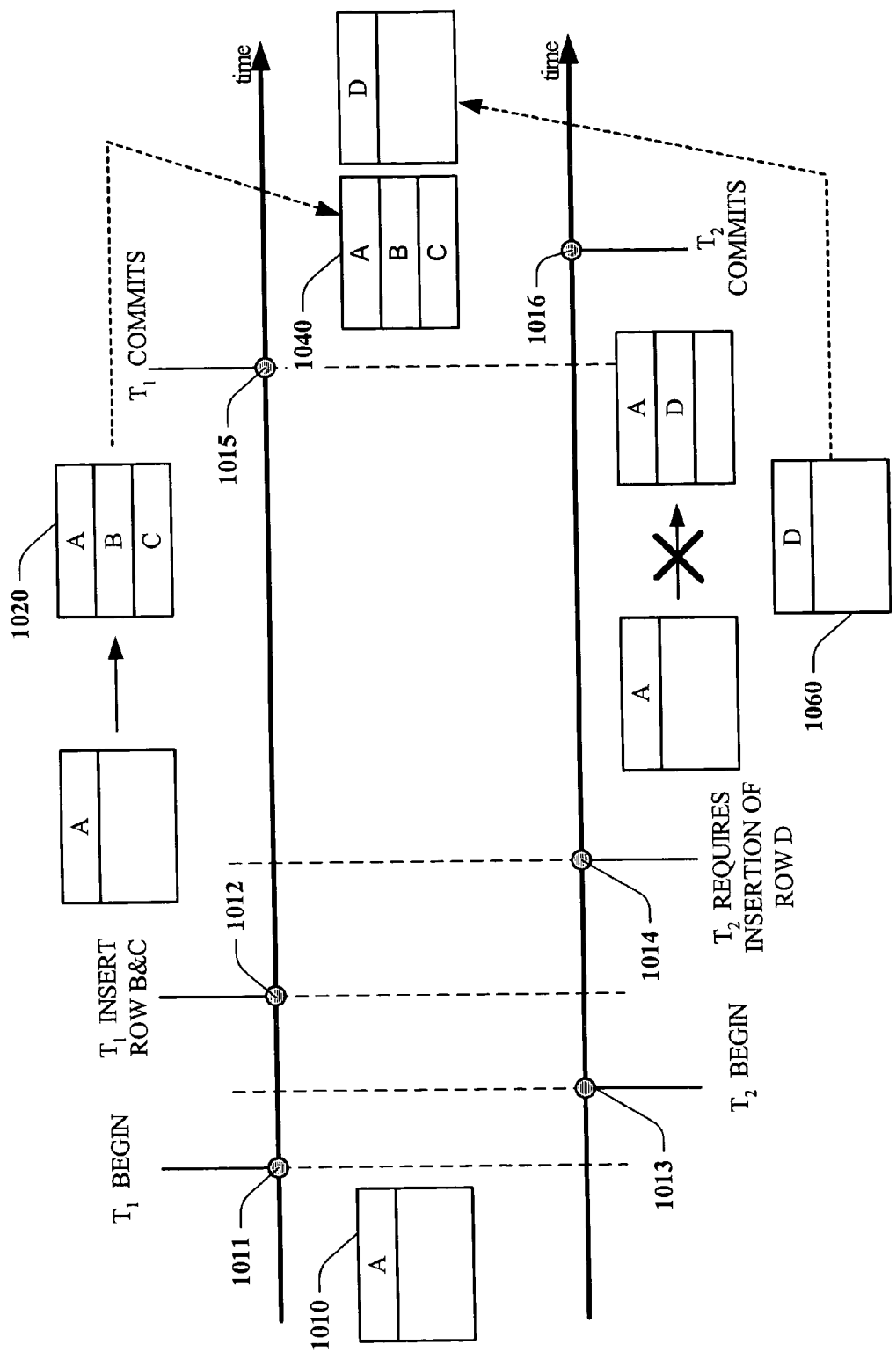
FIG. 10 and FIG. 11 each illustrate application of a methodology according to one aspect of the present invention that can overcome the inefficiencies described with respect to FIG. 5 and FIG. 6 respectively.
Figure 11:
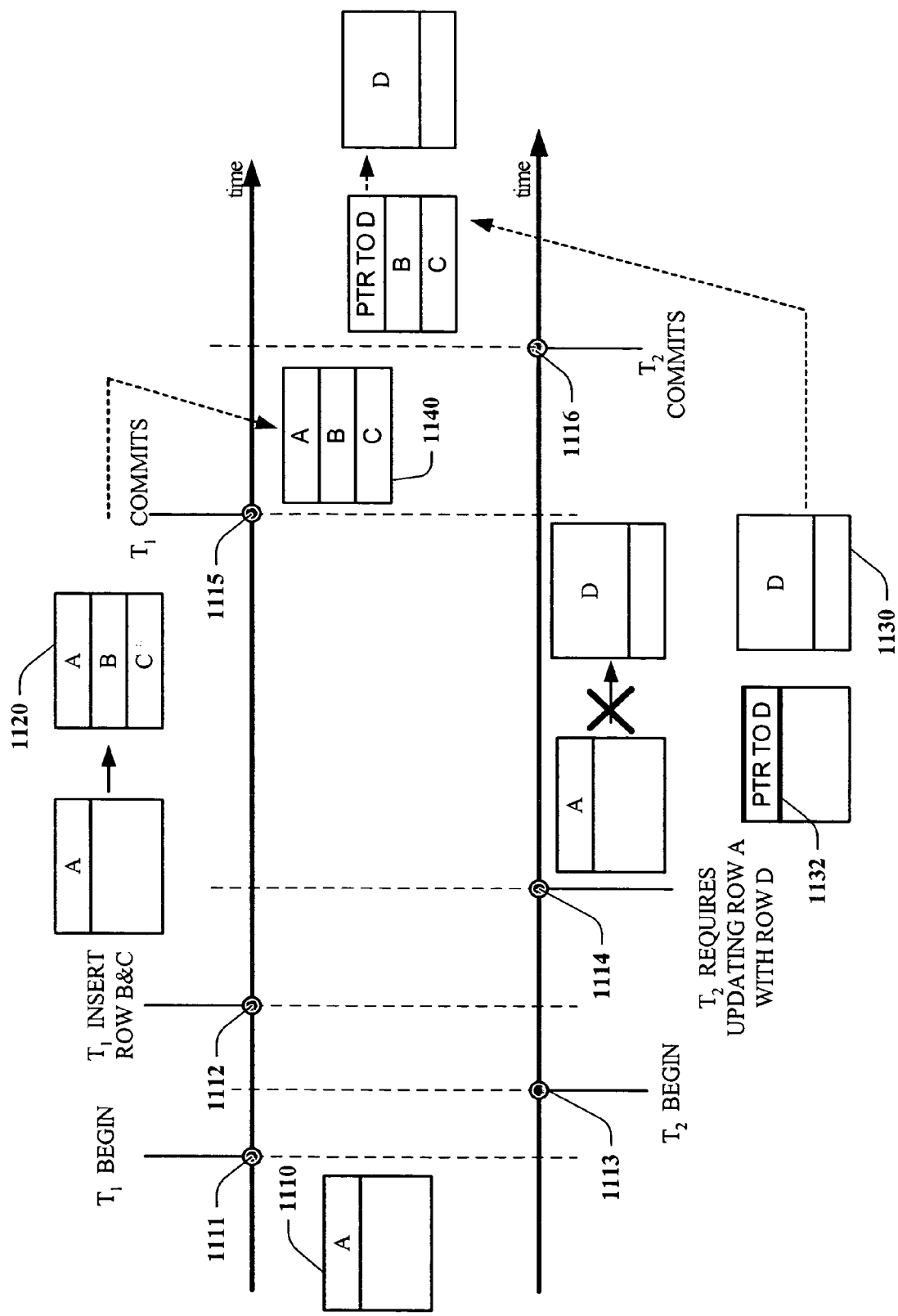

FIG. 10 and FIG. 11 each illustrate application of a methodology according to one aspect of the present invention that can overcome the inefficiencies described with respect to FIG. 5 and FIG. 6 respectively. Referring initially to FIG. 10, two concurrent transaction $T_1$ and $T_2$ are illustrated that can operate on same data page 1010. The data page 1010 initially contains row A. At 1011 $T_1$ begins operation on a copy of data page 1010 and inserts rows B and C at 1012. Such insertions of rows B and C occupy the available space on data page 1010 as depicted at 1020. The heap manager can then employ information supplied by the page aggregator to indicate across all transactions that empty space is no longer available on any copy of page 1010 that exists (the data page at 1020 that is based on a copy of 1010 has consumed all of the space). Accordingly, any other transaction requesting a change that entails using additional space on a copy of page 1010 will be blocked from copying and/or modifying it. For example, another transaction $T_2$ starting at 1013 and requiring insertion of a new row D at 1014 is blocked from copying and modification of the data page, because no room is available thereon. Accordingly, as soon as $T_1$ has consumed available space on the data page, (e.g., when $T_1$ completes operation at 1012) the page aggregator ensures that no other transaction $T_2$ attempts to perform a modification on the data page. Hence, the required insertion by $T_2$ occurs on a new page at 1060. Such methodology prevents both transactions $T_1$ and $T_2$ to insert data on the same page, when there is not enough space available, while at the same time employing a qualified approach to introducing new pages, thus avoiding a size explosion in the database.

In a related aspect, should $T_1$ roll back its modifications and free up space on the data page, the page aggregator in conjunction with the heap manager can indicate the availability of such additional space across all transactions. The roll back can also discard associated locks (e.g. exclusive row locks), such that earlier stored information on space that was to be consumed by the now rolled back transaction, is discarded simultaneously with elimination of the associated locks.

Similarly, FIG. 11 illustrates a methodology that can overcome inefficiencies described with respect to FIG. 6. The data page 1110 initially contains row A. At 1111 $T_1$ begins operation on a copy of data page 1110 and inserts rows B and C at 1112. Such insertions of rows B and C can occupy the available space on data page 1110 as depicted at 1120. The heap manager can then employ information supplied by the page aggregator to indicate across all transactions that no longer is there space available any copy of page 1110 that exists (the data page at 1120 that is based on a copy of 1110 has consumed all of the space). Accordingly, any other transaction requesting a change that entails using additional space on a copy of page 1110 will be blocked from copying and/or modifying it. For example, another transaction $T_2$ starting at 1113 and requiring replacement of row A with row D at 1114 is blocked from copying and modification of the data page, because no room for such replacement is available thereon. Accordingly, as soon as $T_1$ has consumed available space on the data page, (e.g., when $T_1$ completes operation at 1112) the page aggregator can determine for $T_2$ that there is insufficient space to store row D on the data page, as row D consumes twice the space of row A, and $T_1$ has already consumed or claimed such space. Thus, a new page 1130 is allocated for placement of row D that substitutes row A. A forwarding pointer 1132 can also be provided in place of A, which can for example guide a query to new location of data at row D.

Figure 12:
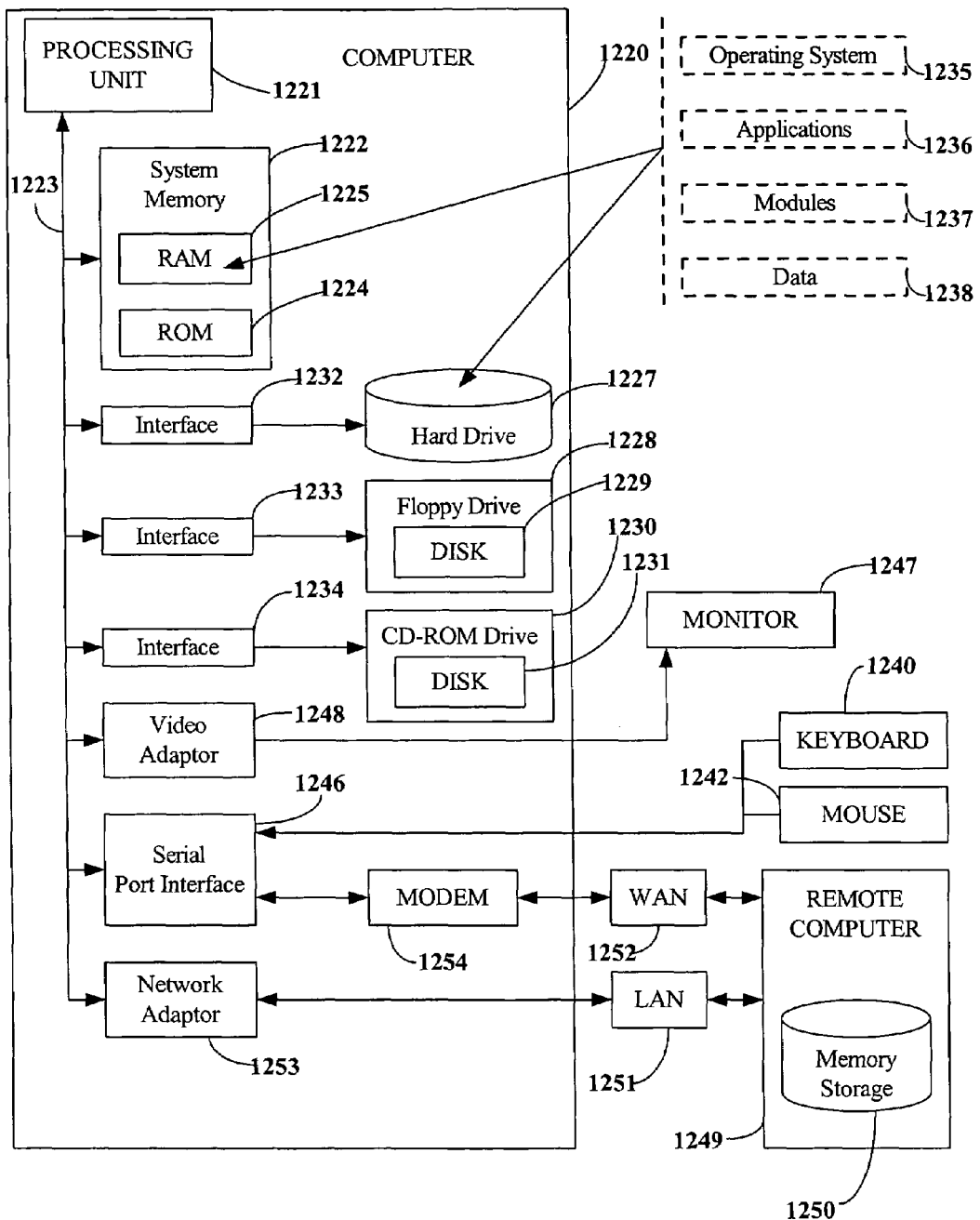
FIG. 12 is a schematic block diagram illustrating a suitable computing environment that can employ various aspects of the present invention.

Referring now to FIG. 12, a brief, general description of a suitable computing environment on the client as well as the server side is illustrated wherein the various aspects of the present invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary includes a computer 1220, including a processing unit 1221, a system memory 1222, and a system bus 1223 that couples various system components including the system memory to the processing unit 1221. The processing unit 1221 may be any of various commercially available processors. Dual microprocessors and other multi-processor architectures also can be used as the processing unit 1221.

The system bus may be any of several types of bus structure including a memory bus or memory controller, a peripheral bus, and a local bus using any of a variety of commercially available bus architectures. The system memory may include read only memory (ROM) 1224 and random access memory (RAM) 1225. A basic input/output system (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading from or writing to a CD-ROM disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions, etc. for the computer 1220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the present invention.

A number of program modules can be stored in the drives and RAM 1225, including an operating system 1235, one or more application programs 1236, other program modules 1237, and program data 1238. The operating system 1235 in the illustrated computer can be substantially any commercially available operating system.

A user can enter commands and information into the computer 1220 through a keyboard 1240 and a pointing device, such as a mouse 1242. Other input devices (not shown) can include a microphone, a joystick, a game pad, a satellite dish, a scanner, or the like. These and other input devices are often connected to the processing unit 1221 through a serial port interface 1246 that is coupled to the system bus, but may be connected by other interfaces, such as a parallel port, a game port or a universal serial bus (USB). A monitor 1247 or other type of display device is also connected to the system bus 1223 via an interface, such as a video adapter 1248. In addition to the monitor, computers typically include other peripheral output devices (not shown), such as speakers and printers.

The computer 1220 can operate in a networked environment using logical connections to one or more remote computers, such as a remote computer 1249. The remote computer 1249 may be a workstation, a server computer, a router, a peer device or other common network node, and typically includes many or all of the elements described relative to the computer 1220, although only a memory storage device 1250 is illustrated in FIG. 12. The logical connections depicted in FIG. 12 may include a local area network (LAN) 1251 and a wide area network (WAN) 1252. Such networking environments are commonplace in offices, enterprise-wide computer networks, Intranets and the Internet.

When employed in a LAN networking environment, the computer 1220 can be connected to the local network 1251 through a network interface or adapter 1253. When utilized in a WAN networking environment, the computer 1220 generally can include a modem 1254, and/or is connected to a communications server on the LAN, and/or has other means for establishing communications over the wide area network 1252, such as the Internet. The modem 1254, which can be internal or external, can be connected to the system bus 1223 via the serial port interface 1246. In a networked environment, program modules depicted relative to the computer 1220, or portions thereof, can be stored in the remote memory storage device. It will be appreciated that the network connections shown are exemplary and other means of establishing a communications link between the computers can be employed.

In accordance with the practices of persons skilled in the art of computer programming, the present invention has been described with reference to acts and symbolic representations of operations that are performed by a computer, such as the computer 1220, unless otherwise indicated. Such acts and operations are sometimes referred to as being computer-executed. It will be appreciated that the acts and symbolically represented operations include the manipulation by the processing unit 1221 of electrical signals representing data bits which causes a resulting transformation or reduction of the electrical signal representation, and the maintenance of data bits at memory locations in the memory system (including the system memory 1222, hard drive 1227, floppy disks 1229, and CD-ROM 1231) to thereby reconfigure or otherwise alter the computer system's operation, as well as other processing of signals. The memory locations wherein such data bits are maintained are physical locations that have particular electrical, magnetic, or optical properties corresponding to the data bits.

Figure 13:
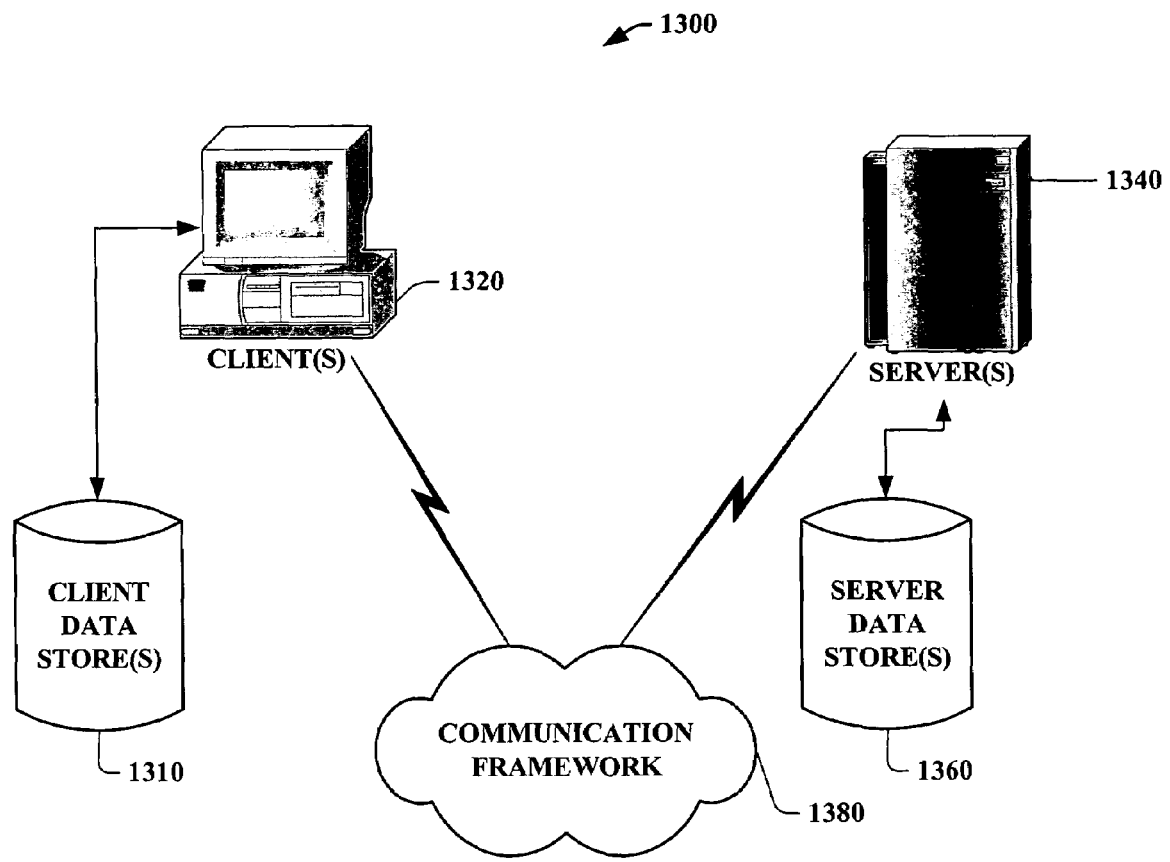
FIG. 13 illustrates a client—server system that can employ a page modification methodology according to one aspect of the present invention.

Referring now to FIG. 13, a client—server system 1300 that employs a data manipulation methodology according to one aspect of the present invention is illustrated. The client(s) 1320 can be hardware and/or software (e.g., threads, processes, computing devices). The system 1300 also includes one or more server(s) 1340. The server(s) 1340 can also be hardware and/or software (e.g., threads, processes, computing devices). For example, such servers 1340 can house threads to perform transformations by employing the present invention. The client 1320 and the server 1340 can communicate, in the form of data packets transmitted according to the present invention, between two or more computer processes. The client/server can also share the same process. As illustrated, the system 1300 includes a communication framework 1380 that can facilitate communications between the client(s) 1320 and the server(s) 1340. The client(s) 1320 is operationally connected to one or more client data store(s) 1310 that can store information local to the client(s) 1320. Moreover, client 1320 can access and update databases 1360 located on a server computer 1340 running a server process. In one aspect of the present invention, the communication frame work 1380 can be the internet, with the client process being a Web browser and the server process being a Web server. As such, a typical client 1320 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1340 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A database management system that manages a database including a database data page, the database data page providing sub-page storage space, the database management system further managing a plurality of concurrent database transactions, each of the concurrent database transactions requiring a modification of the database data page and storing a respective copy of the database data page in a separate reserved space, the database management system comprising:

a processor; and one or more physical computer readable storage media operatively coupled to the processor, the computer-readable storage media having stored thereon computer executable instructions that, when executed by the processor, implement the database management system, including:

a database engine that employs a page aggregator component to facilitate operations of the concurrent database transactions at a sub-page level during modification of the database data page, the database engine comprising:

a lock manager that enables sub-page level locking across the concurrent database transactions and that stores lock information, sub-page level locking grants one of the concurrent database transactions an exclusive lock on a first sub-page of the database data page when the one of the concurrent database transactions requests to modify the first sub-page, the exclusive lock permits the one of the concurrent database transactions to modify a copy of the first sub-page in its respective copy of the database data page while restricting others of the concurrent database transactions from modifying corresponding copies of the first sub-page in their respective copies of the database data page, but allows the others of the concurrent database transactions to modify other sub-pages;

a page aggregator component that operates across the concurrent database transactions to obtain information on an aggregate size change that occurs on the database data page that results when the concurrent database transactions modify their respective copies of the database data page using sub-page level operations, the page aggregator operates across the concurrent database transactions by using the lock information in the lock manager to track the sub-page level operations performed by the concurrent database transactions; and a heap allocation component that employs the information on the aggregate size change to determine a space consumed on the database data page and a space available on the database data page to ensure that the plurality of concurrent multiple database transactions do not consume all of the storage space on the database data page.

2. The database management system of claim 1, the page aggregator component enables determination of space consumption across a respective copy of the database data page employed by each concurrent database transaction.

3. The database management system of claim 1, the heap allocation component and the page aggregator component enforce a set of conditions on a database transaction that operates on the database data page, such that space availability for the database data page prior to the commit stage of the database transaction is assured.

4. In a database management system that manages a database including a database data page, the database data page providing sub-page row storage space, the database management system further managing a plurality of concurrent database transactions, each of the concurrent database transactions requiring a modification of the database data page, a method that facilitates synchronization of the concurrent database transactions comprising:

creating a copy of the database data page for each of the concurrent database transactions, each of the concurrent database transactions storing its respective copy of the database data page in a separate reserved space to facilitate modifying the database data page;

a lock manager assigning a plurality of exclusive row level locks to the concurrent database transactions, the exclusive row level locks assigning each of the concurrent database transactions a different particular row of the database data page and granting the corresponding database transaction exclusive permission to modify the particular row in its respective copy of the database data page, thereby restricting other of the concurrent database transactions from modifying the particular row;

storing information related to the exclusive row level locks assigned by the lock manager;

each of the concurrent database transactions modifying their respective copies of the database data page using row level operations to facilitate modifying the database data page;

a page aggregator obtaining information on an aggregate size change that occurs on the database data page as a result of the row level operations performed on each of the respective copies of the database data page by the concurrent database transactions, the information obtained at least in part by using the stored information related to the exclusive row level locks;

the page aggregator tracking a space consumed on the database data page and a space available on the database data page over all the concurrent database transactions; and a heap allocator ensuring that the concurrent database transactions do not consume all of storage space on the database data page based in part on the space available tracked by the page aggregator.

5. The method of claim 4 further comprising replacing a row of the database data page with a pointer to a row of a new database data page to guide a query to the row in the new database data page.

6. The method of claim 5 further comprising inserting the row on the new database data page.

7. The method of claim 4 further comprising discarding a row lock upon at least one of a roll back of a database transaction or committing a database transaction.

8. A computer program product comprising one or more physical computer readable storage media having stored thereon computer executable instructions that, when executed by a processor, perform the method of claim 4.

9. The method of claim 4 further comprising assuring availability of space on the database data page prior to a commit stage of the concurrent database transactions operating on the database data page to mitigate reorganization of data around the database data page at the commit stage.

* * * * *